United States Patent [19]

Edelmann

[11] 4,286,332
[45] Aug. 25, 1981

[54] METHOD AND APPARATUS FOR PRODUCING SHEAR WAVES FOR SUBSURFACE GEOPHYSICAL INVESTIGATION

[75] Inventor: Hans A. K. Edelmann, Hanover, Fed. Rep. of Germany

[73] Assignee: Prakla-Seismos GmbH, Fed. Rep. of Germany

[21] Appl. No.: 64,589

[22] Filed: Aug. 7, 1979

[30] Foreign Application Priority Data

Aug. 16, 1978 [DE] Fed. Rep. of Germany ....... 2835772

[51] Int. Cl.³ .............................................. G01V 1/155
[52] U.S. Cl. ...................................... 367/75; 181/119; 367/189
[58] Field of Search .......................... 367/75, 189, 190; 181/111, 113, 119, 121

[56] References Cited

U.S. PATENT DOCUMENTS

| 2,745,507 | 5/1956 | Bodine | 367/189 |
| 2,880,816 | 4/1959 | Widess et al. | 367/75 |
| 3,159,232 | 12/1964 | Fair | 181/119 |
| 3,159,233 | 12/1964 | Clynch et al. | 181/119 |
| 3,205,971 | 9/1965 | Clynch | 181/119 |
| 3,208,546 | 9/1965 | Lash | 181/0.5 |
| 3,406,777 | 10/1968 | Bemrose | 181/111 |

*Primary Examiner*—Nelson Moskowitz
*Attorney, Agent, or Firm*—Roylance, Abrams, Berdo & Farley

[57] ABSTRACT

Two or a larger even number of compressional wave producing vibrators are symmetrically disposed in two groups on opposite sides of a profile line in closely spaced relationship. The vibrators are energized by the same (or identical) sweep signals, the signals to one vibrator (or group) on one side of the line being separated in phase by 180° from the signals to the vibrator or group on the other side. P-wave components are thereby cancelled, leaving the shear waves to be propagated.

7 Claims, 3 Drawing Figures

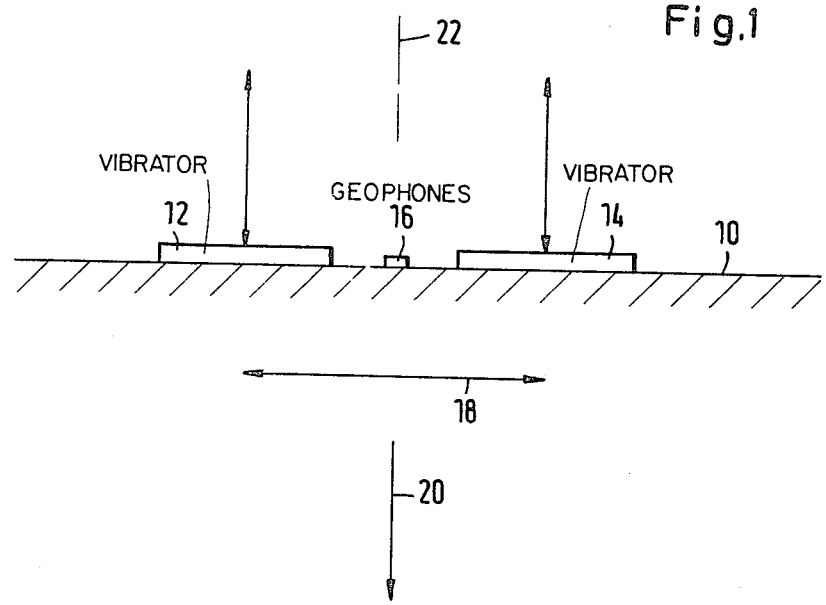
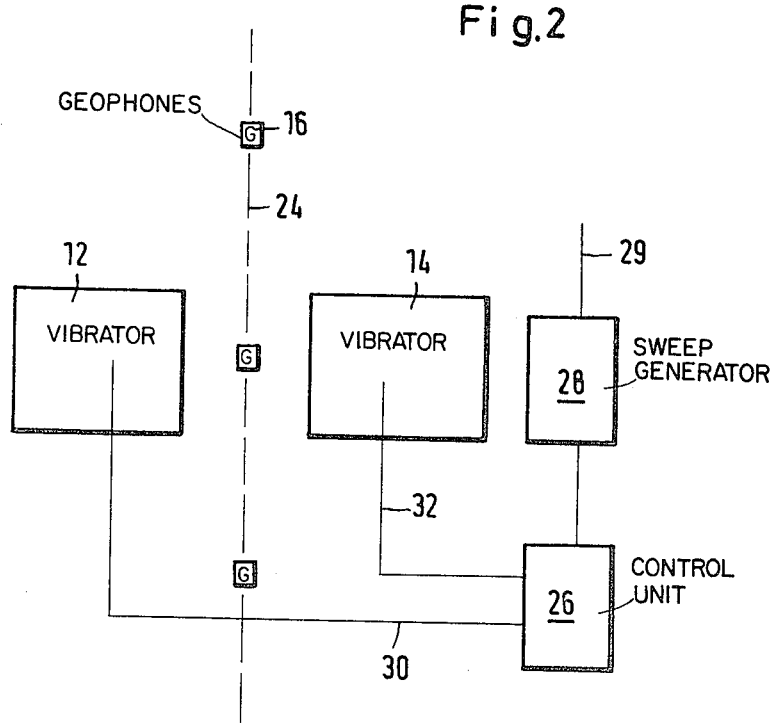

METHOD AND APPARATUS FOR PRODUCING SHEAR WAVES FOR SUBSURFACE GEOPHYSICAL INVESTIGATION

BACKGROUND OF THE INVENTION

It is customary to conduct reflection seismographic measurements by producing acoustic waves which pass through the earth and are reflected, received and analyzed. Normally, such waves are produced by blasting or with one or more vibrators in or on the earth's surface, the conventional sources producing vibrations which are essentially pressure waves (P-waves) and such waves are received with conventional geophones which can be, for example, vertically disposed plunger-coil assemblies or similar devices responsive to waves reflected from interfaces in the sub-soil. It is possible to supplement these measurements by the production and reception of shear waves in which case it is possible to calculate the Poisson constant for individual characteristic reflections from the quotient of the speeds of the P- and S-waves which, in turn, can be analyzed to produce further information about the lithological characteristics of the reflection interfaces. Exhaustive reports concerning the production and reception of shear waves are printed in "Geophysics 1968", pages 229–254, including additional references to literature. The efforts along these lines depend primarily on the use of special vibrators such as those discussed in U.S. Pat. Nos. 3,159,232; 3,159,233; and 3,205,971. Such techniques employ instruments which are built for the special purpose of producing S-waves. They permit the production, of shear waves of the type SH, that is, with the polarization in the plane of the reflection horizon. With the use of correspondingly polarized geophones, good shear wave seismograms have been recorded in these reported experiments.

The vibrators used in the known experiments as shown, for example, in the patents already mentioned, fulfill the physical requirements for this special type of reflection seismic recording in an almost ideal manner. However, in the practical application of these devices, the vibrators have significant disadvantages. Because of the horizontal movement of the vibrator mass, the elements used for the guidance of the mass are very much subject to wear. For the purpose of transferring the shear forces to the sub-soil, the known vibrators are equipped with a steel plate which has pyramid-shaped warts or projections on that surface by which the plate is coupled to the soil. When using these vibrators, especially on highways and roads, expensive damage to the coupling surfaces is caused. A further and very significant disadvantage of these vibrators is that, with the vibrator performance used at the present time and considering the mass necessary therefor, it is not easily possible to insert such a vibrator into equipment which is customarily available for the production of P-waves.

Generally, the experiments, continued until the most recent times in the United States with shear waves for seismic trial operations, have shown that good results can be achieved under the most variable geological and terrain conditions. In almost all areas with the exception of loose sand and water-saturated sediments, shear wave vibrators per se may be used as a source for the production of shear waves of the type SH. At the same time, in many areas, shear wave signals are observed in sufficiently great multiplicity. However, hitherto, the multiplicity has always been at least twice as great as in the case of recording of compression waves. In connection with the recordings heretofore, evaluating and interpreting processes have been developed which, as pointed out above, contribute to the discovery of lithological anomalies.

It will be apparent that special so-called horizontal geophones are needed for the recording of SH waves when they are the primary waves used for sub-soil investigation. Providing testing crews with additional horizontal geophones is much less of a problem that the need for providing special devices for the production of S-waves.

BRIEF DESCRIPTION OF THE INVENTION

Accordingly, an object of the present invention is to provide a simple and efficient method of producing S-waves for sub-soil investigation.

A further object is to provide an apparatus for the production of S-waves for subsurface investigation.

Yet another object is to provide a method of operating readily available apparatus such that S-waves are produced for sub-soil investigation.

Briefly described, the invention includes a process for producing shear waves in the earth for geophysical examination of the sub-soil comprising the steps of providing at least two vibrators of the type usable for the production of compressional waves in the earth, locating the vibrators in spaced, adjacent relationship with the bottom surfaces thereof in coupling contact with the surface of the earth, and concurrently energizing the vibrators with identical sweep signals in counterphase relationship.

In another aspect, the invention contemplates an apparatus for producing essentially horizontally polarized shear waves in the earth for sub-soil geophysical examination comprising an even number of compression wave vibrators, said vibrators being located in closely spaced symmetrical array with half of the vibrators being located on each side of a central line and coupled to the earth's surface; and means for energizing the half of said vibrators on one side of the line with a first sweep signal and the other half of said vibrators with a substantially identical second sweep signal separated in phase from said first signal by substantially 180°.

The invention has the great advantage that one can operate with conventional vibrators. If one assumes that the vibrators radiate essentially sphero-symmetrically into a homogeneous half-chamber, in a situation in which two closely adjacent T-wave vibrators are energized with counterphase signals, the P-waves will be essentially extinguished. It is also the case that the amplitude of force is decreased in the horizontally stimulated waves as compared with the vertical stimulation in the equal phase operation. For this reason, the use of four vibrators is recommended, the vibrators preferably being located at the corner points of a rectangle for which the profile line constitutes a bisecting line and wherein the vibrators on one side of the line are energized with signals of the same phase and the vibrators on the other side of the central line are energized in counterphase, i.e., with signals separated in phase from the first side by 180°.

Contrary to the known instruments built especially for the production of SH waves, such as, for example, those described in the above mentioned U.S. Patents, it is possible when using the P-wave vibrators controlled in counterphase to produce SH waves even on soils which consist of relatively loose sand and water-saturated sediments. This results in an additional advantage besides the simplification through the use of customary instruments.

In order that the manner in which the foregoing and other objects are attained in accordance with the invention can be understood in detail, particularly advantageous embodiments thereof will be described with reference to the accompanying drawings, which form a part of the specification, and wherein:

FIG. 1 is a schematic diagram of a vertical section through the earth perpendicular to a profile line showing an arrangement of vibrators in accordance with the invention;

FIG. 2 is a top plan view of the arrangement of FIG. 1; and

Figure 3:
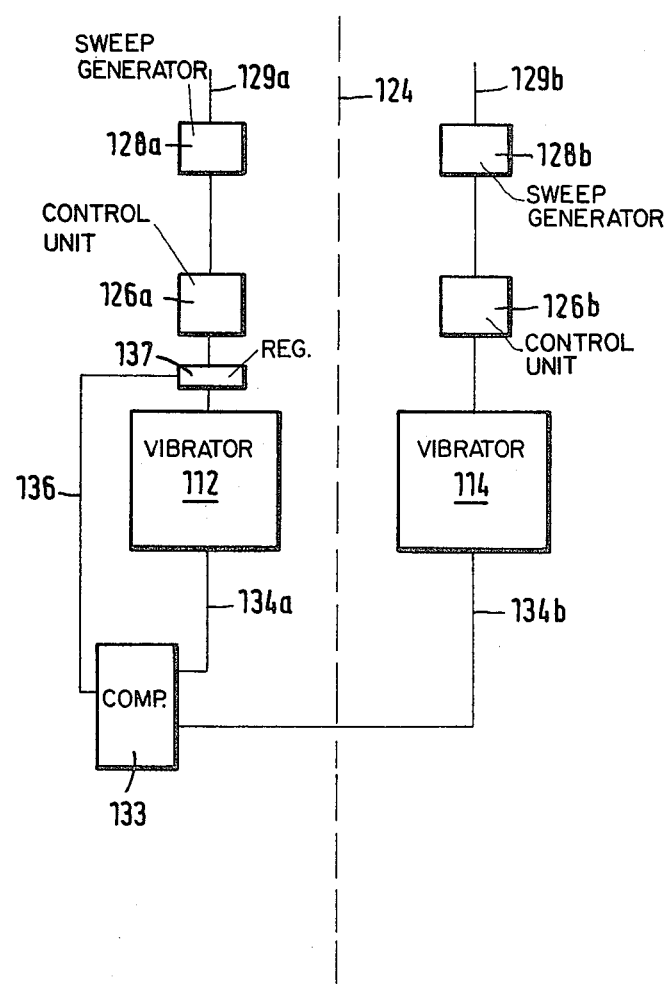
FIG. 3 is a combined schematic top plan view and block diagram of a further embodiment of a vibrator arrangement and control means in accordance with the invention.

An arrangement for carrying out the method of the invention is illustrated in FIGS. 1 and 2 wherein the simplest arrangement employing two vibrators is shown.

A vibrator 12 and a vibrator 14 are disposed on opposite sides of a profile or central line 22 or 24. Vibrators 12 and 14, which are illustrated only in a schematic, simplified manner, produce compression or P-waves as indicated by the double arrows above the vibrator plates in FIG. 1. Since the vibrators 12 and 14 are closely adjacent, the compression waves produced thereby are essentially cancelled and extinguished at least in the central area as a result of the counterphase energization thereof. The developing waves propagated in the direction of arrow 20 are SH waves with the direction of vibration characterized by the double-headed arrow 18. After reflection in the sub-soil from interfaces and anomalous formations therein, the signals returned to the earth's surface are received by the horizontally sensitive geophones 16 which are connected to conventional recording apparatus, not illustrated.

From a central control location, at which the receiving apparatus would normally be located, and which is not shown in the figures, a signal is provided by way of a wire or wireless connection 29 which activates a sweep generator 28, causing the sweep generator to produce sweep signals which are supplied to a control arrangement 26. From the control arrangement 26 sweep signals are conducted through connecting channels 30 and 32 to vibrators 12 and 14. The function of control unit 26 is to reproduce the sweep signal produced by generator 28 in two forms, one being in counterphase relationship to the other so that the signals produced on channels 30 and 32 are replicas of the originally produced sweep signal but separated in phase by 180°.

A preferred embodiment of the invention is shown in FIG. 3 wherein customary compression wave vibrators are used and are supplemented by simple additional devices. The two vibrators 112 and 114 are connected to the outputs of control units 126a and 126b, respectively, which receive sweep signals from sweep generators 128a and 128b, the sweep generators being stimulated into activity by a signal provided on a wire or wireless connection 129a or 129b, as mentioned in connection with FIG. 2.

In order to make sure that the vibrators 112 and 114 will propagate signals of equal magnitude and with opposite phase relationship into the soil, a comparator 133 is provided. The comparator receives signals from sensors, transducers or scanning mechanisms 134a and 134b which are coupled to the vibrators and which produce signals representative of the actual vibratory signals produced by the vibrators. Signals representative of the signals radiated by the vibrators are thus compared with one another in comparator 133 which then produces a control signal or voltage which is transmitted to a regulator unit 137 which performs the function of correcting the amplitude and phase of, in this case, vibrator 112. Regulator 137 assures that the sweep produced by generator 128a is in counterphase to, but otherwise equal to, the sweep of generator 128b. The arrangement shown in FIG. 3 additionally permits the possibility of taking into consideration any kind of influences exercised on the vibrators themselves by the conditions of the soil.

Except for the additional arrangements to accomplish the counterphase control, only conventional devices, and in particular conventional P-wave vibrators are used in the performance of the method of the invention.

While certain advantageous embodiments have been chosen to illustrate the invention it will be understood by those skilled in the art that various changes and modifications can be made therein without departing from the scope of the invention as defined in the appended claims.

What is claimed is:

1. A process for producing shear waves in the earth for geophysical examination of the sub-soil comprising the steps of
   providing at least two vibrators of the type usable for the production of compressional waves in the earth,
   locating the vibrators in spaced, adjacent relationship with the bottom surfaces thereof in coupling contact with the surface of the earth, and
   concurrently energizing the vibrators with identical sweep signals in counterphase relationship.

2. A process according to claim 1 wherein a plurality of vibrators are located in each of two parallel lines, the vibrators in the lines being separated from each other by substantially equal distances.

3. A process according to claim 2 and further including a linear array of geophones coupled to the surface of the earth providing a plurality of geophones along the central line.

4. An apparatus for producing essentially horizontally polarized shear waves in the earth for sub-soil geophysical examination comprising
   an even number of compression wave vibrators, said vibrators being located in closely spaced symmtrical array with half of the vibrators being located on each side of a central line and coupled to the earth's surface; and
   means for energizing the half of said vibrators on one side of the line with a first sweep signal and the other half of said vibrators with a substantially identical second sweep signal separated in phase from said first signal by substantially 180°.

5. An apparatus according to claim 4 wherein said means for energizing includes
   first and second means for supplying said first and second signals, respectively, to said vibrators;

regulator means connected between at least one of said first and second means and the vibrators associated therewith for adjusting the magnitude and phase of signals supplied to said vibrators in response to a control signal;

transducer means coupled to at least two of said vibrators for producing signals representative of the phase and frequency characteristics of said vibrators; and comparator means connected to said transducer means for comparing said signals and for producing said control signal.

6. An apparatus according to claim 4 wherein said means for energizing includes
   a sweep signal generator; and
   circuit means connected to receive the output of said sweep signal generator for producing two counterphase signals substantially identical to each other.

7. An apparatus according to claim 4 wherein each of said first and second signals is a monofrequency signal.

* * * * *